United States Patent
Thomas et al.

(10) Patent No.: US 7,743,884 B2
(45) Date of Patent: Jun. 29, 2010

(54) SANDWICH PANEL FOR SOUND ABSORPTION

(75) Inventors: Christian Thomas, Hamburg (DE); Ralph Gerstner, Hamburg (DE)

(73) Assignee: Airbus Deutschland GmbH (DE)

( * ) Notice: Subject to any disclaimer, the term of this patent is extended or adjusted under 35 U.S.C. 154(b) by 7 days.

(21) Appl. No.: 12/316,913

(22) Filed: Dec. 17, 2008

(65) Prior Publication Data

US 2009/0166127 A1 Jul. 2, 2009

Related U.S. Application Data

(60) Provisional application No. 61/007,878, filed on Dec. 17, 2007.

(30) Foreign Application Priority Data

Dec. 17, 2007 (DE) ........................ 10 2007 060 662

(51) Int. Cl.
*B64C 1/20* (2006.01)
(52) U.S. Cl. ........................ 181/292; 181/293; 415/119; 244/1 N; 244/119
(58) Field of Classification Search ................. 181/210, 181/213, 214, 292, 293; 415/119; 244/1 N, 244/117, 119; 428/116, 117, 118
See application file for complete search history.

(56) References Cited

U.S. PATENT DOCUMENTS

| | | | |
|---|---|---|---|
| 3,021,916 A * | 2/1962 | Kemp ........................ 181/292 |
| 3,529,693 A | 9/1970 | Woodward et al. |
| 3,542,152 A | 11/1970 | Adamson |
| 3,748,213 A | 7/1973 | Kitching et al. |
| 3,769,767 A | 11/1973 | Scott |
| 3,821,999 A | 7/1974 | Guess et al. |
| 3,948,346 A | 4/1976 | Schindler |
| 3,972,383 A | 8/1976 | Green |
| 4,001,473 A * | 1/1977 | Cook ........................ 428/116 |
| 4,084,366 A | 4/1978 | Saylor et al. |
| 4,155,211 A * | 5/1979 | Saylor et al. ............... 52/794.1 |
| 4,850,093 A * | 7/1989 | Parente ........................ 29/428 |

(Continued)

FOREIGN PATENT DOCUMENTS

DE 1917475 11/1969

(Continued)

*Primary Examiner*—Jeffrey Donels
*Assistant Examiner*—Jeremy Luks
(74) *Attorney, Agent, or Firm*—Lerner, David, Littenberg, Krumholz & Mentlik, LLP

(57) ABSTRACT

An aircraft cabin panel for sound absorption, with a sandwich construction, comprising a core layer that comprises a plurality of tube-like or honeycomb-like cells that extend in an open manner across the thickness of the core layer and that are separated from each other by cell walls and that are uniform in design. A first cover layer faces away from the sound field, as well as a second cover layer that faces towards the sound field and that comprises a plurality of perforation holes and adjacent cells are interconnected by way of apertures in the cell walls. The perforation of the second cover layer comprises a distance (b) between holes, which distance exceeds the opening width (c) of the cells of the core layer, wherein the first cover layer is closed and wherein the cell walls comprise a perforation so that they are acoustically transparent in the direction parallel to the cover layers.

8 Claims, 2 Drawing Sheets

U.S. PATENT DOCUMENTS

| | | | |
|---|---|---|---|
| 5,180,619 A | | 1/1993 | Landi et al. |
| 5,653,836 A | * | 8/1997 | Mnich et al. .................. 156/98 |
| 5,743,488 A | * | 4/1998 | Rolston et al. ............ 244/53 B |
| 5,888,610 A | * | 3/1999 | Fournier et al. ............. 428/116 |
| 6,065,717 A | * | 5/2000 | Boock ........................ 244/1 N |
| 6,122,892 A | | 9/2000 | Gonidec et al. |
| 6,135,238 A | * | 10/2000 | Arcas et al. ................. 181/292 |
| 6,179,086 B1 | | 1/2001 | Bansemir et al. |
| 6,607,625 B2 | * | 8/2003 | Andre et al. ................ 156/169 |
| 2002/0157764 A1 | | 10/2002 | Andre et al. |

FOREIGN PATENT DOCUMENTS

| | | |
|---|---|---|
| DE | 2112393 | 10/1971 |
| DE | 2134220 | 1/1972 |
| DE | 2211051 | 10/1972 |
| DE | 2650886 | 5/1977 |
| DE | 19804718 | 8/1999 |
| DE | 20016051 U | 9/2000 |
| EP | 352993 | 1/1990 |
| EP | 705165 | 4/1996 |
| EP | 0747285 | 12/1996 |
| EP | 0824066 | 2/1998 |
| EP | 1188547 | 3/2002 |
| FR | 913070 | 8/1946 |
| GB | 1373063 | 11/1974 |
| GB | 2349445 | 11/2000 |
| GB | 2364366 | 1/2002 |
| GB | 2404966 | 2/2005 |
| JP | 2007230130 | 9/2007 |

\* cited by examiner

SANDWICH PANEL FOR SOUND ABSORPTION

CROSS-REFERENCE TO RELATED APPLICATIONS

This application claims the benefit of the filing date of U.S. Provisional Patent Application No. 61/007,878 filed Dec. 17, 2007, the disclosure of which is hereby incorporated herein by reference.

BACKGROUND OF THE INVENTION

The present invention relates to an aircraft cabin panel for sound absorption. The invention in particular also relates to a device for sound absorption in an aircraft cabin.

Acoustic panels are used in rooms in order to improve the acoustic characteristics of the room, in that the sound that is perceived to be disturbing is absorbed by the panels, e.g. in aircraft cabins. As the demand for greater comfort in rooms generally increases, at the same time there is a parallel demand for improved conditions of travel in aircraft, among other things also relating to room acoustics during flight operation. To this effect it is desirable to use sandwich panels for sound absorption in the interior of aircraft cabins so as to reduce the noise load in the cabin interior. The noises that are to be damped include, for example, the sound generated by the engines, and also the sound generated by mechanical air conditioning, and last but not least the sound generated by passengers themselves.

BRIEF SUMMARY OF THE INVENTION

In relation with acoustic panels, sandwich constructions, for example, comprise a core layer with a multitude of tube-like or honeycomb-like cells that extend in an open manner across the thickness of the core layer and that are separated from each other by cell walls and that are uniform in design, and a first cover layer that faces away from the sound field, as well as a second cover layer that faces towards the sound field and that comprises a multitude of perforation holes, wherein adjacent cells are interconnected by way of apertures in the cell walls. One option of increasing the absorption in the aircraft cabin relates to the use of sound-absorbent sandwich panels in which at least the cover layer that faces the exciting sound field is designed so as to be acoustically transparent. By perforating a cover layer that is arranged in front of a limited air volume a perforated liner resonator is created. Such acoustic resonators, which form a distributed Helmholtz resonator, can also be regarded as a spring-mass damping system. While the spring is determined by the rigidity of the air volume, the air plug in the region of the perforation opening represents the mass. The damping that is decisive to the broad bandwidth of the achievable absorption results from losses that occur within the perforation opening at resonance. The resonance frequency is determined by the geometry of the pores and by the size of the hollow space volume of each perforation opening, i.e. the honeycomb volume. From DE 200 16 051 U1 a sound-absorbent composite panel is known in which a honeycomb core is arranged between two metal cover layers of which the side facing the sound comprises a percentile of perforated surface of less than 1%, wherein the diameter of the perforations is approximately 0.02 to 0.5 mm. However, these composite panels are far too heavy for the use in aircraft. From U.S. Pat. No. 5,180,619 a panel is known in which a honeycomb-like core structure is provided between two perforated facing sheets. By way of a hole in the cell wall each honeycomb cell that is formed by the core structure communicates with the adjacent honeycomb cell so as to ensure air exchange if the panel is compressed, and to ensure sound exchange between the cells. Furthermore, GB 1 373 063 discloses an acoustic panel in which the honeycomb cells communicate with each other by way of small outflow apertures in the form of incisions on the two edges of the face ends of the cell walls in order to drain off moisture that during operation enters the region of the engines, and at the same time also in order to improve the acoustic damping characteristics. From U.S. Pat. No. 3,821,999 an acoustic liner for use in the intake of aircraft engines is known, which liner comprises a honeycomb sandwich panel in which the cell walls of the honeycomb cells are not arranged perpendicularly to the cover layers but instead obliquely in the direction of the incident sound waves. Furthermore, U.S. Pat. No. 3,948,346 describes a multi-layered acoustic liner for use in the intake region of aircraft engines, in which liner several layers of honeycomb backing material are arranged one behind the other so that they alternate with perforated cover sheets. Finally, DE 2 112 393 discloses a sound dissipating liner for aircraft turbines, in which liner V-shaped and rhombus-shaped cells are arranged between two cover layers, which cells extend parallel to the cover layers, wherein some of the cell walls are porous. However, the proposed solutions are not suitable for use in the cabin interior, because there is insufficient space for installation, and furthermore because such a design results in panels that are too heavy for large-area use in the interior of aircraft cabins. Furthermore, known sound-absorbing sandwich panels with a honeycomb core are associated with a disadvantage in that the cell walls of the honeycomb structure limit the volume of the hollow spaces.

There may be a need to provide a sandwich panel for use in aircraft with improved sound absorption characteristics.

According to an exemplary embodiment of the invention an aircraft cabin panel of the type mentioned above is provided in which the perforation of the second cover layer comprises a distance between holes, which distance exceeds the opening width of the cells of the core layer.

The device according to the invention comprises an advantage in that a larger hollow space volume is available for sound absorption because the individual honeycomb cells communicate with each other by way of the apertures in the cell walls. As a result of the enlargement of the hollow space volume for each aperture of the perforation the resonance frequency is displaced to the low-frequency region, i.e. the particularly critical region in relation to sound absorption. With a given thickness of the panel, the distance between the openings determines the volume of the hollow spaces.

In a preferred embodiment the diameter of the holes of the second cover layer is less than 1 mm, and the percentile of perforated surface is less than 1%. This design, also referred to as microperforation, provides an absorption spectrum with a comparatively broad bandwidth, which is particularly suitable for use in aircraft because the sounds that are to be damped in this environment can comprise a wide spectral frequency distribution.

Preferably, the cell walls comprise perforation so that they are acoustically transparent in the direction parallel to the cover layers in order to make the best-possible utilisation of the adjacent hollow spaces of the honeycomb cells. In this arrangement the cell walls are to be designed such that they allow unhindered passage of sound between the cells. Perforation is at the same time also associated with reduced weight, which is always advantageous in aircraft engineering.

In a particularly preferred embodiment the second cover layer is designed so as to be multi-layered, comprising a layer that determines the strength, and a perforated film or foil. Firstly, this is associated with more precise and simpler production of the perforation because the latter is significantly easier to achieve in a (thinner) film or foil than in a (thicker) supporting layer. Secondly, with a small perforation diameter the thinner film or foil also results in a smaller air volume within the aperture, in other words the mass of the air plug in the region of the perforation aperture is smaller, which in general corresponds to the design rule in the case of shallow design depths according to the selection of a small acoustic mass. The option of using pre-perforated semi-finished products provides a further advantage.

Preferably, at least some of the hollow spaces of the core layer are filled with a porous sound-absorbent material in order to achieve additional sound damping, e.g. in particularly critical regions such as the aisle region or in first class.

Further preferred is an embodiment in which the hollow spaces of the core layer differ in height so that by different volumes it can form different springs, i.e. different spring-mass damping systems.

Preferred is an embodiment in which further layers are provided between the first cover layer and the second cover layer. In this way the construction characteristics such as rigidity, i.e. resistance to warping or deflection, can be improved. By the further layers it is also possible to improve the acoustic characteristics.

Preferably the first cover layer is closed. In this way the sound-absorbent sandwich panels according to the invention can in principle be used as finishing wall elements which do not require a separate cover for the back.

In an alternative embodiment, the first cover layer is also designed so as to be acoustically transparent in order to be able to carry out additional sound reduction measures on the side facing away from the room, e.g. with the application of sound-absorbent materials.

In a further preferred embodiment the cover layers comprise fibre reinforced materials so that the lightest-possible and at the same time stable panels are obtained, wherein the mechanical and visual characteristics of said panels correspond to those of the remaining panels in the cabin lining arrangement.

The invention relates in particular to a device for sound absorption in an aircraft cabin in which between the aircraft supporting structure and the cabin space an interior lining arrangement formed by panels is provided. In order to improve noise reduction, according to the invention, within the cabin at least some of the panels are designed as sound-absorbent sandwich panels according to any one of the preceding embodiments. In this arrangement particularly the surface of the sandwich panels can be made to match the remaining cabin layout.

BRIEF DESCRIPTION OF THE DRAWINGS

Below, an exemplary embodiment of the invention is illustrated in more detail with reference to the enclosed drawings. The following are shown.

DETAILED DESCRIPTION

Figure 1:
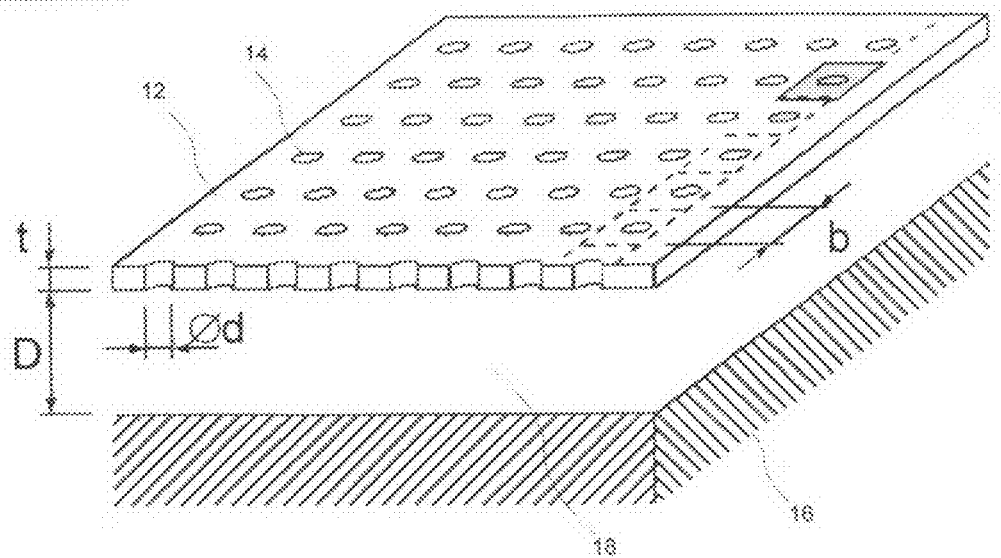
FIG. 1 an isometric section view of a perforated liner resonator.
Figure 2:
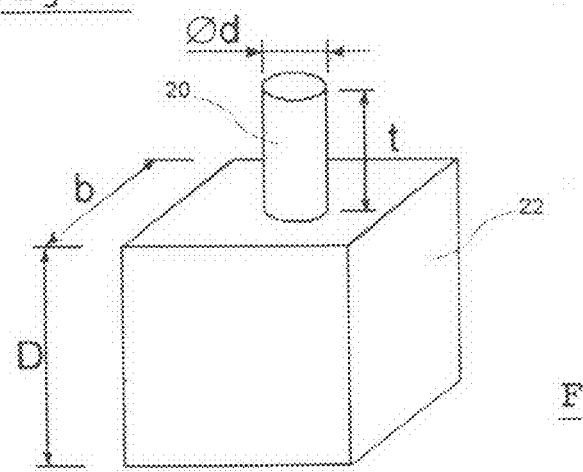
FIG. 2 an isometric view of the principle structure of a Helmholtz resonator.
Figure 3:
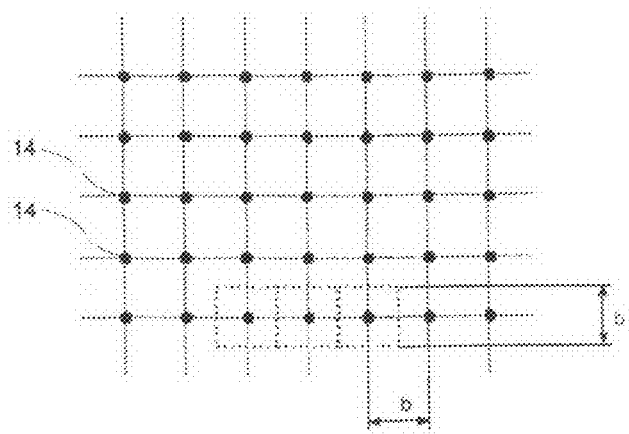
FIG. 3 determining the percentile of perforated surface of the perforated liner resonator of FIG. 1.

FIG. 1 shows the principle design of a perforated liner resonator that comprises a perforated liner 12 which comprises a multitude of holes 14. The perforated liner 12 of a thickness t is arranged at a distance D in front of a rear delimitation area 16 so that an air volume 18 is enclosed between the perforated liner 12 and the delimitation area 16. In order to consider the way of operation of the perforated liner resonator, said resonator can also be considered to be an addition of several Helmholtz resonators. FIG. 2 shows the basic structure of a Helmholtz resonator with the four geometric parameters hole diameter d, distance between holes b, liner thickness t and thickness of the air cushion D. The Helmholtz resonator, which in FIG. 2 is shown without the volume-delimiting components, represents an acoustic resonator, which can also be regarded as a spring-mass damping system, comprising an air plug 20 in the region of the aperture 14 of the perforated liner 12, and a percentile 22 of air volume of the air volume 18. While the spring is determined by the rigidity of the percentile 22 of air volume, the air plug 20 in the region of the perforation aperture represents the mass. The resonance frequency is determined by the geometry of the perforation apertures 14 (pores) and the size of the hollow space volume fraction 22 for each pore 14. In the case of perforated liner resonators without honeycomb backing (see FIG. 2) this hollow space volume 22 results from the so-called percentile of perforated surface (b*b) and the thickness D of the rear air layer 18 (see also FIG. 3).

Figure 4:
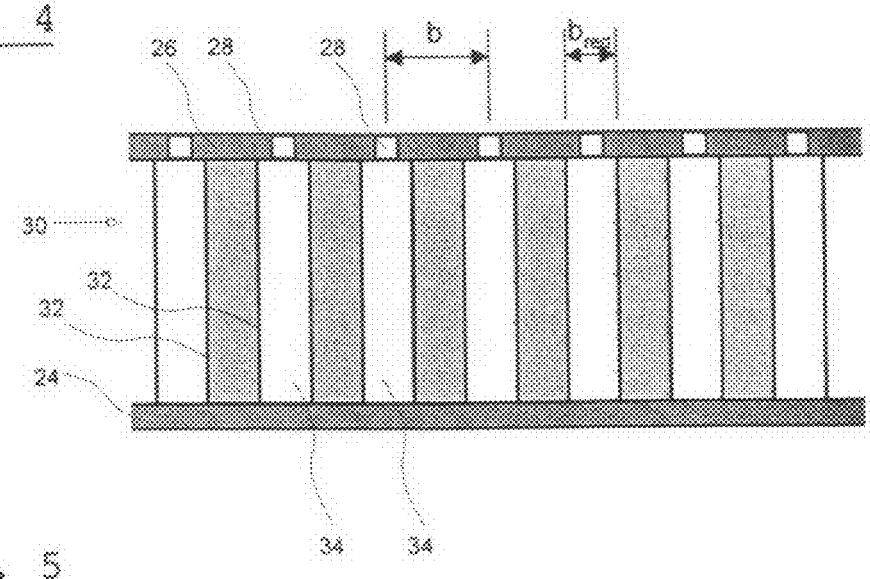
FIG. 4 a section through a sandwich panel with a honeycomb core according to prior art.

In the case of a perforated honeycomb liner, i.e. a honeycomb core between two cover layers, of which at least one is perforated, the air volume 18 between the perforated liner 12 and the delimitation area 16 is subdivided by the honeycomb core. In this context FIG. 4 shows a sandwich liner with a bottom, first cover layer 24 facing away from the sound, and a sandwich liner with a top, second cover layer 26 facing the sound, wherein in the example shown only the second cover layer 26 comprises a multitude of apertures 28. Between the first cover layer 24 and the second cover layer 26 a honeycomb core 30 with cell walls 32 is arranged, whose honeycomb cells extend so as to be perpendicular to the cover layers 24, 26, thus enclosing an air volume 34. While the space between perforation apertures 28 continues to be b, for each pore 28 there is however only the air volume 34 available, which air volume 34 is delimited by the cell walls 32 of the honeycomb structure 30. The air volume of each honeycomb cell that is non-perforated on the cover layer side cannot be used for sound absorption. Of course, it is also possible that only every third cell or every nth cell comprises a perforation aperture 28 in the second cover layer 26. Furthermore, the available volumes are relatively small, in particular in the case of liner thicknesses that are usually thin.

Figure 5:
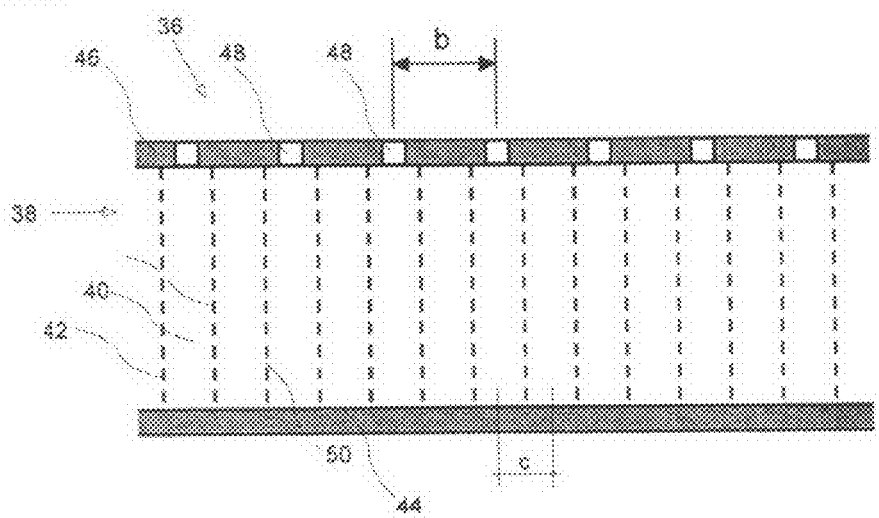
FIG. 5 a section through a sandwich panel with a honeycomb core according to the invention.

FIG. 5 shows a sandwich panel 36, according to the invention, for sound absorption, in which a core layer 38 comprises a multitude of tube-like or honeycomb-like cells 40 that extend in an open manner across the thickness of the core layer 38. The cells 40 are uniform and separated from each other by cell walls 42. The core layer is arranged between a first cover layer 44 that faces away from the sound field and a second cover layer 46 that faces the sound field. The second cover layer 46 is perforated with a multitude of holes 48. The first cover layer 44 is designed so as to be closed, wherein both cover layers 44, 46 comprise, for example, fibre-reinforced material.

Figure 6:
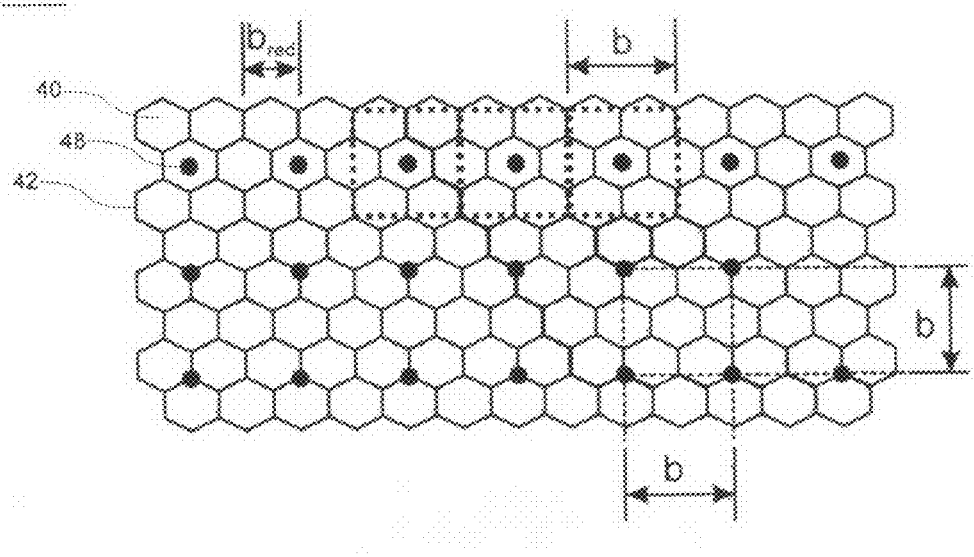
FIG. 6 determining the percentile of perforated surface in a liner with a honeycomb core according to FIG. 5.

In order to increase the volume of each aperture 48, which volume is available for sound absorption, the cell walls 42 are perforated, i.e. they comprise a multitude of holes 50 so that the cells 40 are acoustically connected to each other. The cell walls 42 are thus acoustically transparent in the direction parallel to the cover layers 44, 46, i.e. the honeycomb core itself is acoustically transparent. FIG. 6, in a section parallel to the cover layers 44, 46, diagrammatically shows the effective air volume for each perforation aperture 48 with a superimposed honeycomb structure. The diagram clearly shows that despite the honeycomb structure an increased region of air volume is available.

In FIG. 5 the perforation 48 of the second cover layer 46 comprises a distance b between holes that is twice as large as the opening width (spacing c) of the cells 40 of the core layer 38. The diameter of the holes 48 of the second cover layer 46, which holes for the sake of clarity are shown so as to be enlarged in FIG. 5, is less than 1 mm, wherein the percentile of perforated surface is less than 1%. The second cover layer 46 features a multi-layered construction (not shown), wherein a layer that determines the strength, as well as a perforated film or foil, are provided. In order to still further improve the sound insulation characteristics of the sandwich panel, a part of the hollow spaces 40 of the core layer 38 can be filled with a porous sound-absorbent material.

Due to its light weight while at the same time providing an optimal absorption effect and adequate rigidity, the sandwich panel is, in particular, suited for use as a device for sound absorption in an aircraft cabin. To this effect between the aircraft supporting structure and the cabin space an interior lining arrangement comprising panels is provided, in which interior lining arrangement at least some of the panels are designed as sound-absorbent sandwich panels according to FIG. 5.

It should be noted that the term "comprising" does not exclude other elements or steps and the "a" or "an" does not exclude a plurality. Also elements described in association with different embodiments may be combined.

It should also be noted that reference signs in the claims shall not be construed as limiting the scope of the claims.

The invention claimed is:

1. An aircraft cabin panel for sound absorption having a sandwich-like construction comprising:
   a core layer comprising a plurality of tube-like or honeycomb-like cells that extend in an open manner across the thickness of the core layer and that are separated from each other by cell walls and that are uniform in design;
   a first cover layer that faces away from a sound field; and
   a second cover layer that faces towards the sound field and comprises a plurality of perforation holes;
   wherein adjacent cells are interconnected by way of apertures in the cell walls wherein the perforation holes of the second cover layer have a distance (b) between holes, which distance exceeds an opening width (c) of the cells of the core layer;
   wherein the first cover layer is closed; and
   wherein the cell walls comprise a perforation so that they are acoustically transparent in the direction parallel to the cover layers.

2. The aircraft cabin panel of claim 1, wherein the diameter of the holes of the second cover layer is less than 1 mm, and the percentile of perforated surface is less than 1%.

3. The aircraft cabin panel of claim 1, wherein the second cover layer is multi-layered, comprising a layer that determines the strength, and a layer of one of a perforated film or foil.

4. The aircraft cabin panel of claim 1, wherein at least some of the hollow spaces of the core layer are filled with a porous sound-absorbent material.

5. The aircraft cabin panel of claim 1, wherein the hollow spaces of the core layer differ in height.

6. The aircraft cabin panel of claim 1, wherein further layers are provided between the first cover layer and the second cover layer.

7. The aircraft cabin panel of claim 1, wherein the cover layers comprise fiber reinforced materials.

8. A device for sound absorption in an aircraft cabin in which between an aircraft supporting structure and the cabin space an interior lining arrangement formed by panels is provided, wherein at least one or more of the panels are sound-absorbent aircraft cabin panels comprising:
   a core layer comprising a plurality of tube-like or honeycomb-like cells that extend in an open manner across the thickness of the core layer and that are separated from each other by cell walls and that are uniform in design;
   a first cover layer that faces away from a sound field; and
   a second cover layer that faces towards the sound field and comprises a plurality of perforation holes;
   wherein adjacent cells are interconnected by way of apertures in the cell walls wherein the perforation holes of the second cover layer have a distance (b) between holes, which distance exceeds an opening width (c) of the cells of the core layer;
   wherein the first cover layer is closed; and
   wherein the cell walls comprise a perforation so that they are acoustically transparent in the direction parallel to the cover layers.

* * * * *